(12) United States Patent
Lopez-Torres, Jr.

(10) Patent No.: US 8,903,731 B1
(45) Date of Patent: Dec. 2, 2014

(54) SYSTEM AND METHOD FOR INCENTIVIZING AND COORDINATING MEETINGS

(75) Inventor: Augusto Lopez-Torres, Jr., Orlando, FL (US)

(73) Assignee: Complete The Pair, LLC, Orlando, FL (US)

( * ) Notice: Subject to any disclaimer, the term of this patent is extended or adjusted under 35 U.S.C. 154(b) by 0 days.

(21) Appl. No.: 13/412,025

(22) Filed: Mar. 5, 2012

Related U.S. Application Data

(60) Provisional application No. 61/449,253, filed on Mar. 4, 2011.

(51) Int. Cl.
*G06Q 10/00* (2012.01)

(52) U.S. Cl.
USPC .......................................................... 705/7.19

(58) Field of Classification Search
CPC .......................... G06Q 10/1095; G06Q 10/109
USPC ..................... 705/11–44, 329, 7.44
See application file for complete search history.

(56) References Cited

U.S. PATENT DOCUMENTS

| | | | | |
|---|---|---|---|---|
| 7,925,513 | B2* | 4/2011 | Chao et al. | 705/7.11 |
| 2003/0208384 | A1* | 11/2003 | Nelson et al. | 705/4 |
| 2004/0172358 | A1* | 9/2004 | Lent et al. | 705/38 |
| 2005/0159976 | A1* | 7/2005 | Schwartz et al. | 705/1 |
| 2008/0082382 | A1* | 4/2008 | Castineiras | 705/7 |
| 2008/0288277 | A1* | 11/2008 | Fasciano | 705/1 |
| 2013/0218798 | A1* | 8/2013 | Ponnada et al. | 705/329 |

OTHER PUBLICATIONS

Wayne Elsey, Soles 4 Soul website, 2006.*
Soles4Souls, Website, 2008, About section.*

* cited by examiner

*Primary Examiner* — Beth V Boswell
*Assistant Examiner* — Zahra Elkassabgi
(74) *Attorney, Agent, or Firm* — Christopher M. Ramsey; GrayRobinson, P.A.

(57) ABSTRACT

A computer based machine system and method for coordinating a meeting between a meeting requester and a meeting prospect are described. The invention includes a meeting requester interface that allows a meeting requester to submit a meeting request. A computer readable identification code associated with a complementary article set, including at least two functionally complementary articles, is stored in a database and cross-referenced with the meeting request. A complementary article of the complementary article set is shipped to the meeting requester and a second complementary article of the complementary article set is shipped to the meeting prospect. If the meeting prospect accepts the meeting, the complementary articles may be united at the meeting and a corresponding donation to charity made.

19 Claims, 5 Drawing Sheets

SYSTEM AND METHOD FOR INCENTIVIZING AND COORDINATING MEETINGS

CROSS-REFERENCE TO RELATED APPLICATION

The application claims the benefit of U.S. Provisional Application Ser. No. 61/449,253 filed on Mar. 4, 2011 titled "Complete the Pair. A Computer Implemented Method of Creating Incentive for a Buyer Agreeing to Meet a Sales Rep," the contents of which are hereby incorporated by reference in their entirety.

FIELD OF THE INVENTION

The invention relates to a system, machine, and associated methods for coordinating a meeting between a meeting requester and a meeting prospect.

BACKGROUND

Although sales is a major foundation of any business, one of the largest difficulties associated with generating sales is obtaining worthwhile meetings with potential sales prospects. There are a plethora of techniques that sales professionals use to make these contacts, including referrals, cold calls, emails, advertisements, and focused letters. Unfortunately, acquiring even a short, informal meeting with a sales prospect can sometimes take months or even years using these techniques. Many times, the sales prospects are pleased with their current vendors and do not have the time or motivation to meet with sales people. Companies and individuals spend a significant amount their operating budgets on promotional items geared towards forming these relationships, however, at the end of the day, these items are often discarded, a relationship is never formed, and neither party benefits.

SUMMARY

It is an object of the invention to provide a system, machine, and associated methods for coordinating a meeting between a meeting requester and a prospect with whom the requester would like to meet by incentivizing the prospect to accept the meeting using a set of complementary articles that can be united at the meeting. After being united, the complementary articles themselves may be donated to charity or a money donation may be made.

According to an embodiment of the invention, a computer-based method for coordinating and incentivizing a meeting between a meeting requester and a meeting prospect, the method being executed by at least one network-connected computer system having a processor and machine readable memory, includes executing a meeting requester interface for allowing the meeting requester to submit a meeting request, the meeting request being stored in a database. A computer readable identification code associated with a complementary article set, including at least two functionally complementary articles, is entered into the database and is cross-referenced with the meeting request. A first shipment of a first complementary article of the complementary article set to the meeting requester and a second complementary article of the complementary article set to the meeting prospect is initiated by the computer system. A meeting prospect interface for allowing the meeting prospect to input a requester identification code cross-referenced with the meeting request in the database and for allowing the meeting prospect to accept the meeting request is also generated by the computer system. When the requestor identification code is inputted by the meeting prospect, the requester identification code queries the database to retrieve the identification of the requester and allow the identification of the requester to be displayed at the meeting prospect interface.

According to another embodiment of the invention, a computer based system for coordinating a meeting between a meeting requester and a meeting prospect comprises at least one network-connected computer system having a processor and machine readable memory, is provided. The system is configured to the execute the meeting requester interface, enter the computer readable identification code associated with the complementary article set into the database, cross-reference the computer readable identification code with the meeting request, initiate shipment of the first and second complementary articles, and generate the meeting prospect interface.

An alternative method aspect of the invention includes receiving a meeting request from the meeting requester, the meeting request identifying the meeting prospect and a charity and storing the meeting request on a database. The meeting request is associated with a complementary article set, the complementary article set being a plurality of functionally complementary articles. A first shipment of a first complementary article of the complementary article set to the meeting requester and a second shipment of a second complementary article of the complementary article set to the meeting prospect is prepared. The meeting prospect is provided access to the network-connected computer system through a network-connected electronic device operable by the meeting prospect. Information about the meeting requester is displayed to the meeting prospect for allowing the meeting requester to accept or deny the meeting request. A delivery instruction for the complementary article set is also supplied. The delivery instruction for the complementary article set includes a shipping address for the meeting coordinator.

These and other objects, aspects, and advantages of the present invention will be better appreciated in view of the drawings and following detailed description of the preferred embodiments.

DETAILED DESCRIPTION OF PREFERRED EMBODIMENTS

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other features, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
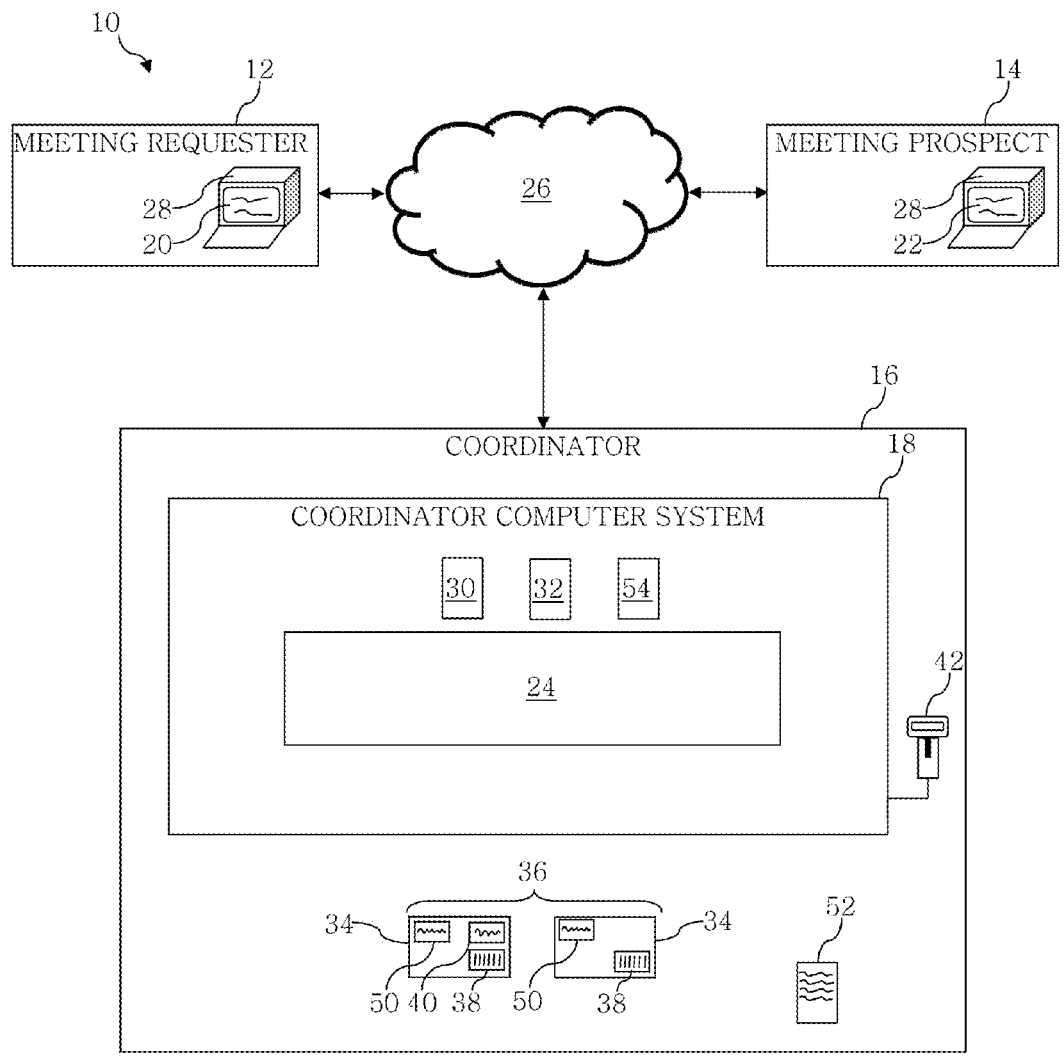
FIG. 1 is a schematic overview of a system for coordinating a meeting between a meeting requester and a meeting prospect, according to an embodiment of the invention.
Figure 2:
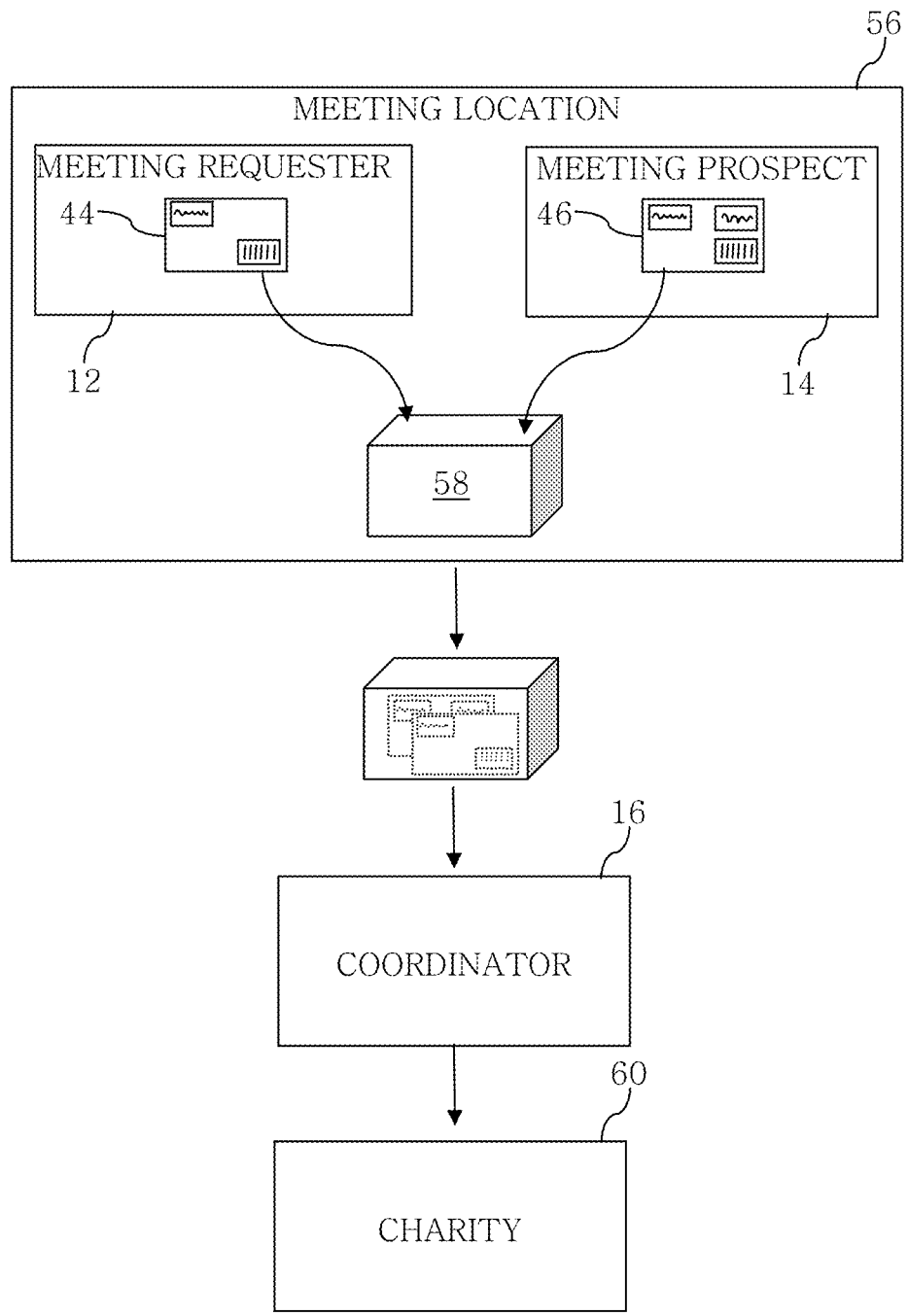
FIG. 2 is a schematic overview of how a complementary article set is used in accordance with an embodiment of the invention.

Referring to FIG. 1-2, according to an embodiment of the invention, a meeting coordination system 10 for coordinating a meeting between a meeting requester 12 and a meeting prospect 14 includes a coordinator 16 having a coordinator computer system 18 configured to execute a meeting requester interface 20, a meeting prospect interface 22, and a meeting database 24. The coordinator computer system 18 is accessible directly or through a network 26 to the meeting requester 12 and meeting prospect 14 through the Internet.

The meeting coordination system 10 allows a meeting requester 12 to register with the coordinator computer system 18 via the meeting requester interface 20 and for the meeting prospect 14 to inquire, via the meeting prospect interface 22, about a meeting request received by the meeting prospect 14. In either case, these interfaces 20, 22 are preferably in the form of Internet websites that the meeting requester 12 and meeting prospect 14 can access through a network-connectable electronic device 28 such as computer, tablet, PDA, mobile phone, or the like. The network-connectable electronic device 28 typically allows access the Internet directly through an Internet Service Provider (ISP) or indirectly through another network interface. Additionally, the coordinator computer system 18 may allow for access directly or through a network other than the Internet.

The coordinator computer system 18 and its interfaces 20, 22 and meeting database 24 are executed by at least one processor 30 executing program instructions stored on machine readable memory 32. The invention is not limited to any particular number, type, or configuration of processors 30, nor to any particular programming language, memory storage format or memory storage medium. In implementations of the coordinator computer system 18, the meeting coordination system 10 is not necessarily limited to any geographical location or networking or connection of the processors and/or storage media, provided that the processors and/or storage media are capable of cooperating to execute the interfaces 20, 22 and meeting database 24. It is not required that the processors and/or storage media be commonly owned or controlled. Additionally, although the meeting database 24 is referred to here as a single database, it is not necessary that it be located on a single memory media unit or at a single physical location. The meeting database 24 may be divided into sub-databases for categorizing information if desired.

In general, a meeting requester 12 is a person or entity that desires to obtain a meeting with a meeting prospect 14. Although not limited to sales professionals, it may be advantageous for sales professionals, for example, to use the meeting coordination system 10 in order to provide an incentive for a meeting prospect 14 with whom the sales professional would like to meet to accept the meeting. Accordingly, a meeting prospect 14 is a person or entity with whom the meeting requester 12 requests a meeting using the meeting coordination system 10.

As stated above, an aspect of the invention is to provide an incentive for the meeting prospect 14 to accept a meeting request from the meeting requester 12. This is advantageously achieved through the use of complementary articles 34 obtainable by the meeting coordinator 16. As used herein, a "complementary article" is an article that is typically used for its intended purpose in combination with another article. For example, complementary articles 34 may include a left shoe and a right shoe, a paint brush and paint, a hammer and nail(s), or two halves of a coupon, among many other possibilities. Additionally, a "complementary article set" 36 is a set of complementary articles 34 such as for example, a complete pair of shoes. While in some instances it may be desirable for the complementary article set 36 to form a pair of complementary articles 34, this is not always necessary as a complementary article set 36 may include more than two complementary articles 34.

The complementary articles 34 are preferably associated with one or more computer readable identification codes 38 by way of, for example, printing the computer readable identification code 38 on the article or attaching to the complimentary articles 34 a tag on which the computer readable identification code 38 is located. Optionally, at least one of the complementary articles 34 in a complementary article set 36 may also have a requester code 40, such as a series of letters, numbers, symbols, or a combination thereof, associated therewith. In a preferred embodiment, the requester code 40 is a code that the meeting prospect 14 can enter into the meeting prospect interface 22 in order to query the coordinator computer system 18 as to the meeting requester's 12 identity.

In practice, the meeting requester 12 can communicate with the coordinator computer system 18 via the meeting requester interface 20. The meeting requester 12 submits its biographical information to the coordinator computer system 18 and the coordinator computer system 18 stores the biographical information in the meeting database 24. Suitable biographical information includes the meeting requester's 12 identity and contact information. It may also include preferred meeting locations, meeting dates, and meeting times.

When the meeting requester 12 makes a meeting request, the meeting requester 12 identifies the meeting prospect 14. The meeting requester 12 may submit the meeting prospect's 14 contact information if known. The coordinator computer system 18 receives the meeting request via the meeting requester interface 20 and stores the meeting prospect's 14 information in the meeting database 24. The processor 30 cross-references the meeting requester's biographical information with the meeting prospect's 14 information.

The coordinator computer system 18 then locates a complementary article set 36. The computer readable identification codes 38 associated with the complementary articles 34 in the complementary article set 36 are scanned using a scanning device 42 that is in a data communication relationship with the coordinator computer system 18, and, more particularly, the database 24. Suitable scanning devices 42 include electronic optical scanners such as bar code readers or the like. If a requester code 40 that is different from the computer readable identification code 38 is employed, the different requester code 40 may be entered into the coordinator computer system 18. The scanned computer readable identification codes 38 are stored in the meeting database 24 and are cross-referenced by the processor 30 with the meeting request. The requester code 40 is also stored in the meeting database 24 and is also cross-referenced with the meeting request.

The coordinator computer system 18 initiates the shipment of a first complimentary article 44 of the scanned complimentary article set 36 to the meeting requester 12 and the shipment of a second complimentary article 46 of the scanned complimentary article set 36 to the meeting prospect 14. Shipment may take place via typical shipment services such as ground, air, boat, or rail. In certain preferred embodiments, the complimentary articles 34 may be associated with one or more shipping codes 50 for allowing the meeting requester 12 to track the geographic location of the shipments by entering the one or more shipping codes 50 into the meeting requester interface 20.

The second complimentary article 46 is preferably shipped with a set of instructions for educating the meeting prospect 14 about the meeting coordination system 10 and instructing the meeting prospect 14 how to access the coordinator computer system 18 via the meeting prospect interface 22. The second complimentary article 46 is preferably also shipped with the requester code 40 and a meeting request document 52.

The meeting request document 52 may be generated by the meeting requester 12 by entering the information the meeting requester 12 desires to portray to the meeting prospect 14. This information may include, for example, a sales pitch, a description of the meeting requester 12, reasons for the requesting the meeting, and/or a description of the meeting coordinator system 10. In a preferred embodiment, the meeting requester 12 inputs this information at the meeting requester interface 20 and the information is transmitted to the coordinator computer system 18 where it is stored in the meeting database 24. The coordinator computer system 18 later generates the meeting request document 52 for including with the second complimentary article 46 shipment.

The meeting prospect 14 can determine the identity of the meeting requester 12 by entering the requester code 40 at the meeting prospect interface 22. This initiates a query to the coordinator computer system 18 to return the meeting requester's 12 biographical information. The coordinator computer system 18 retrieves the biographical information that is cross-referenced with the requester code 40 and allows the biographical information to be displayed at the meeting prospect interface 22. The meeting prospect 14 can then review the meeting requester's 12 biographical information and decide whether to accept the meeting request. The meeting prospect interface 22 provides the meeting prospect 14 with the option to accept or deny the request. The meeting prospect's 14 decision is transmitted to the coordinator computer system 18 and is stored in the meeting database 24. The coordinator computer system 18 then initiates an electronic message to be sent to the meeting requester 12 indicating the meeting prospect's 14 decision.

After the meeting prospect 14 enters the requester code 40, the meeting prospect 14 and meeting requester 12 may communicate messages electronically through a meeting communication module 54 that is adapted to allow the parties to communicate via an electronic mail system or the like that is facilitated through the coordinator computer system 18.

Referring particularly now to FIG. 2, if the meeting prospect 14 accepts the meeting request, the meeting prospect 14 and requester 12 bring their respective complimentary articles 44,46 to an agreed upon meeting location 56 thereby uniting the complimentary article set 36. The complimentary article set 36 is placed into packaging 58 that is addressed to the coordinator 16. In a preferred embodiment, the packaging 58 is pre-addressed to the coordinator 16 and is shipped with either the first 44 or second 46 complimentary article to the meeting requester 12 or meeting prospect 14. After being united at the meeting, the complimentary article set 36 is shipped to the coordinator 36. When the coordinator 16 subsequently receives the complimentary article set 36, the complimentary article set 36 is scanned with the scanner 42, which communicates receipt of the complimentary article set 36 to the meeting database 24 where an indication that the complimentary article set 36 was returned is stored.

There are several ways in which a charitable donation using the complimentary article set 36 may take place. In one embodiment, the coordinator 16 later ships the complimentary article set 36 to the charity 60 of the meeting requester's 12 choosing.

In another embodiment, the coordinator 16 receives the complimentary article set 36 and sends a donation in the amount of the complimentary article set's 36 value to the charity 60. In this manner, the complimentary articles 44, 46 may be re-used in connection with coordinating another meeting as described herein.

By coordinating shipment of the complimentary article set 36 or the donations to the charity 60, the invention advantageously increases the likelihood that the meeting prospect 14 will accept the meeting.

If the meeting prospect 14 denies the meeting request, the meeting requester 12 may insert the first complimentary article 44 into the packaging 58 and arrange, via the coordinator computer system 18, to send the packaging 58 to the meeting prospect 14 for allowing the meeting prospect 14 to place the second complimentary article 46 in the packaging 58 and send the packaging 58 to the charity 60 or the meeting coordinator 16.

Figure 3:
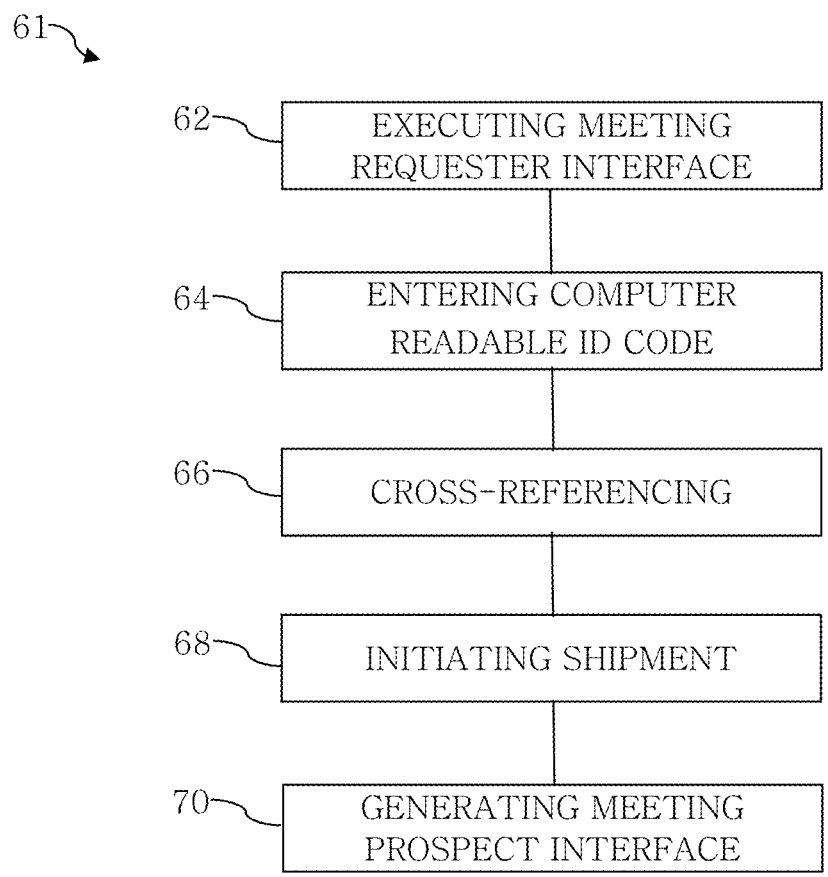
FIG. 3 is a flow diagram of a method of coordinating a meeting between a meeting requester and a meeting prospect, according to an embodiment of the invention.

Now, referring to FIG. 3, an exemplary computer based method for coordinating a business meeting 61 will be described. The method 61 is preferably executed using the previously described meeting coordination system 10.

In a preferred embodiment, the method 61 includes executing a meeting requester interface 62 for allowing the meeting requester 12 to submit a meeting request. The meeting requester interface may be executed by generating a web page that the meeting requester can access via a network-connected electronic communications device. At the meeting requester interface, the meeting requester may enter biographical information about the meeting requester itself, information about the meeting prospect, and information about the meeting requester's preferred charity, including the charity's shipping address. The meeting request is transmitted via a network to a computer system where it is then stored in a database of meeting requests.

The method 61 further includes entering a computer readable identification code 64 associated with a complimentary article set, including at least two functionally complimentary articles, into the database. This may be accomplished by electronically scanning the computer readable identification codes for the complimentary articles using a scanner that is in a data communication relationship with the computer system. Once the codes are entered, a processor then proceeds with cross-referencing 66 the computer readable identification codes with the meeting request.

The method 61 continues by initiating shipment 68 of a first complementary article of the complementary article set to the meeting requester and a second complementary article of the complementary article set to the meeting prospect. Initiating the first shipment of the first complementary article may be achieved by supplying delivery instruction for the first complementary article. A suitable delivery instruction includes a shipping address for the meeting requester. Similarly, initiating the first shipment of the second complementary article may be achieved by supplying delivery instruction for the second complementary article. A suitable delivery instruction includes a shipping address for the meeting prospect. Initiating may also include producing a requester identification code cross-referenced with the meeting request for shipping with the second complementary article.

Once the meeting prospect receives the second complementary article, the method proceeds by generating a meeting prospect interface 70 for allowing the meeting prospect to input a requester identification code cross-referenced with the meeting request in the database and for allowing the meeting prospect to accept the meeting request, wherein inputting the requester identification code queries the database to retrieve the identification of the requester and allows the identification of the requester to be displayed at the meeting prospect interface. The meeting prospect interface may be generated via a web page that the meeting prospect can access via a network-connected electronic communications device. At the meeting prospect interface, the meeting prospect can enter the requester code. Using the requester code, the computer system retrieves the meeting request data from the database and displays the meeting requester's identity at the meeting requester interface. At this point, the meeting prospect interface also presents the meeting requester with the option to accept the meeting request by a meeting acceptance indicator, such as box the meeting requester can check. The meeting prospect's decision is transmitted from the meeting prospect interface to the database.

The method 61 may also include initiating a second shipment of the complementary article set to the charity identified by the meeting requester at the meeting requester interface. This may be achieved by supplying a delivery instruction for the complementary article set, the delivery instruction for the complementary article set comprising a shipping address for the charity.

Alternatively, the method 61 may include initiating a second shipment of the complementary article set to a meeting coordinator by supplying delivery instruction for the complementary article set, the delivery instruction having a shipping address for the meeting coordinator. Accordingly, the method may further include, receiving the complementary article set and scanning the computer readable identification codes using an electronic optical scanner in a data communication relationship with the database. Subsequently, a donation to a charity, the charity being identified by the meeting requester at the meeting requester interface, may be provided.

Each shipment may include a computer trackable shipping code for allowing the meeting requester to track the geographic location of a particular shipment though a conventional electronic shipment tracking means.

Figure 4:
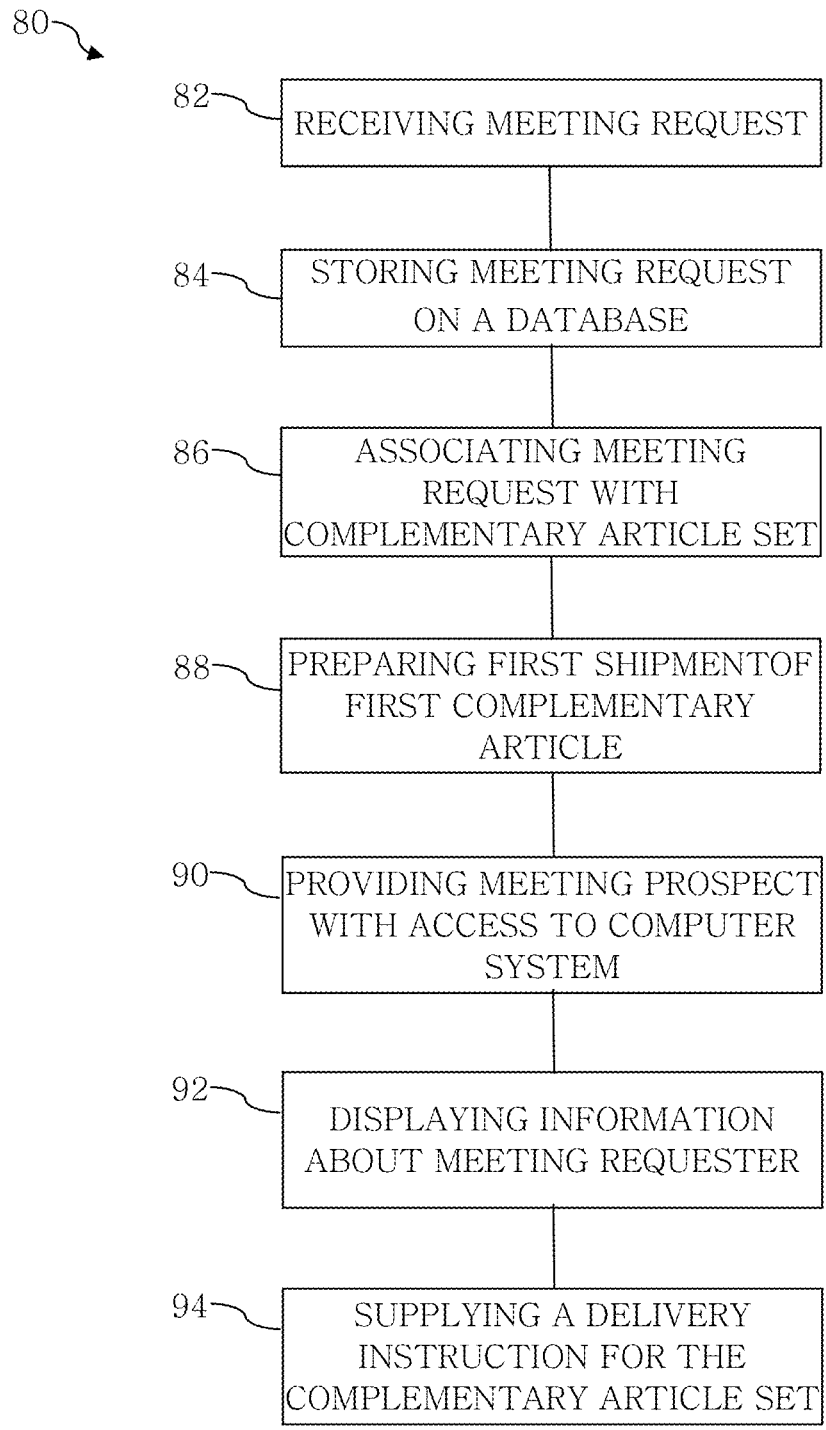
FIG. 4 is a flow diagram of another method of coordinating a meeting between a meeting requester and a meeting prospect, according to an embodiment of the invention.

Moving now to FIG. 4, an alternative computer based method 80 for coordinating a meeting between a meeting requester and a meeting prospect, the method being executed by at least one network-connected computer system having a processor and machine readable memory, will be described.

The method 80 includes receiving a meeting request 82 from the meeting requester in which the meeting request identifies the meeting prospect and the charity. The meeting request is received after the meeting requester inputs the meeting request at the meeting requester interface. The method continues by storing the meeting request on a database 84 of the network-connected computer system.

The method further includes associating 86 the meeting request with a complementary article set, the complementary article set being a plurality of functionally complementary articles. This may be accomplished by electronically scanning the computer readable identification codes for the complementary articles using a scanner that is in a data communication relationship with the computer system. Once the codes are entered, the processor cross-references the computer readable identification codes with the meeting request.

An additional feature of the method 80 includes preparing a first shipment of a first complementary article 88 of the complementary article set to the meeting requester and a second shipment of a second complementary article of the complementary article set to the meeting prospect. This may be accomplished by supplying a delivery instruction for the first complementary article and a delivery instruction for the second complementary article. Suitable delivery instructions include shipping addresses for the meeting requester and meeting prospect, respectively. A computer trackable shipping code may be included with the second complementary article for allowing the meeting requester to track the geographic location of the second complementary article.

The method 80 further includes providing the meeting prospect with access to the network-connected computer system 90 through a network-connected electronic device operable by the meeting prospect. The meeting prospect may access the network-connected computer system via a web page that the meeting prospect can access using a network-connected electronic communications device. At the meeting prospect interface, the meeting prospect can enter the requester code. Using the requester code, the computer system retrieves the meeting request data from the database. Thereafter, the method 80 continues by displaying information about meeting requester 92 at the meeting prospect interface. The meeting prospect is allowed to indicate whether it accepts or denies the meeting request at the meeting requester interface.

Thereafter, the method 80 moves forward with supplying a delivery instruction 94 for the complementary article set, which may include a shipping address for the charity or the coordinator.

In certain embodiments of the method 80, the network-connected computer system includes a communication module for allowing the meeting requester and meeting prospect to communicate electronically through the network-connected computer system. In this manner, the communications module allows the meeting requester and meeting prospect to send email or email like correspondence through the network-connected computer system.

In additional embodiments, the method 80 further includes receiving the complementary article set, scanning a computer readable identification code identifiable with a complementary article set using an electronic optical scanner in a data communication relationship with the database, thereby re-associating the complementary article set with the meeting request. Subsequently, a donation to a charity, the charity being identified by the meeting requester at the meeting requester interface, may be provided. The monetary value of the donation approximates the monetary value of the of the complementary article set.

Figure 5:
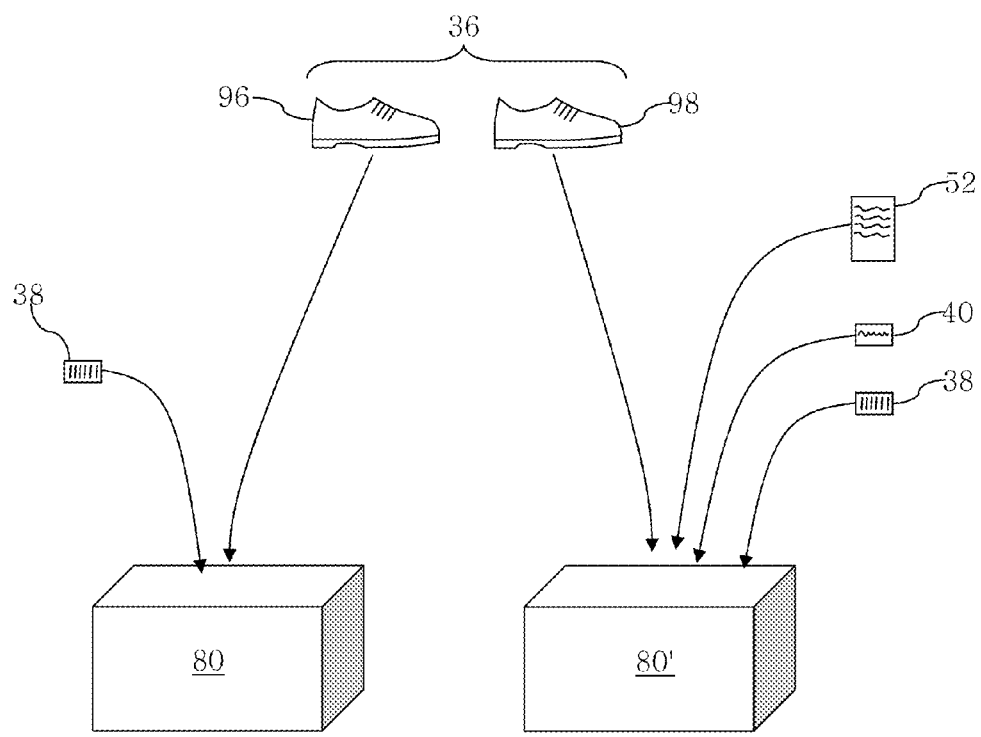
FIG. 5 is a schematic overview of a use of a particular complementary article set, according to an embodiment of the invention.

Now referring to FIG. 5, an exemplary use of a specific type of complementary article set 36 will be explained. In this example, the complementary article set 36 is a right shoe 96 and a left shoe 98. Each shoe 96, 98 is packaged with its respective computer readable identification code 38, which may, for example, be attached to the shoe 96, 98, printed on the packaging material, or loosely placed in the package 80, 80' with the shoe 96, 98. The package 80' that will be sent to the meeting prospect contains, not only the shoe 98, and the computer readable identification code 38, but also the meeting request document 52 and the requester code 40.

The present invention has been described with reference to the accompanying drawings, in which preferred embodiments of the invention are shown. This invention may be embodied in many different forms and should not be construed as limited to the illustrated embodiments set forth herein. Rather, these illustrated embodiments are provided so that this disclosure will be thorough, complete, and will convey the invention to those skilled in the art.

It is to be understood, for example, that the use of the invention is in no way limited to the field of sales. It may be used by any type of meeting requester who desires to meet with any type of meeting prospect.

Therefore, in the specification set forth above there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

I claim:

1. A computer-implemented method for coordinating a meeting between a meeting requester and a meeting prospect, the method being executed by at least one network-connected computer system having a processor, machine readable memory, and a database, the method comprising:

receiving a meeting request from a meeting requester interface of the meeting requester and storing the meeting request in the database cross-referenced with the meeting requester;

entering, into the database, a computer readable identification code associated with a complementary article set, the complementary article set including at least two functionally complementary articles;

cross-referencing, by the processor, the computer readable identification code with the meeting request so that the computer readable identification code is identified with the meeting request;

initiating, by the processor, a first shipment of a first one of the complementary articles of the complementary article set to the meeting requester and a second one of the complementary articles of the complementary article set to the meeting prospect and producing, by the processor, a requestor identification code cross-referenced with the meeting request and a meeting request document for shipping with the second complementary article;

upon receipt of the second one of the complementary articles by the meeting prospect, receiving the requester identification code input by the meeting prospect into a meeting prospect interface;

querying the database using the requester identification code to retrieve an identification of the meeting requester; and instructing the meeting prospect to enter a decision to accept or decline the meeting request at the meeting prospect interface and transmitting the decision via the coordinator computer system to the meeting requester.

2. The method of claim 1, wherein the meeting requester interface is a website displayable on a network-connected electronic device operable by the meeting requester.

3. The method of claim 1, wherein the entering step comprises scanning the computer readable identification codes using an electronic optical scanner in a data communication relationship with the database.

4. The method of claim 1, wherein the meeting prospect interface is a website displayable on a network-connected electronic device operable by the meeting prospect.

5. The method of claim 1, further comprising initiating a second shipment of the complementary article set to a charity, the charity being identified by the meeting requester at the meeting requester interface.

6. The method of claim 5, wherein initiating the second shipment of the complementary article set to a charity comprises supplying a delivery instruction for the complementary article set, the delivery instruction for the complementary article set comprising a shipping address for the charity.

7. The method of claim 1, wherein initiating the first shipment of the first complementary article comprises supplying delivery instruction for the first complementary article, the delivery instruction for the first complementary article comprising a shipping address for the meeting requester.

8. The method of claim 7, wherein initiating the first shipment of the second complementary article comprises supplying delivery instruction for the second complementary article, the delivery instruction for the second complementary article comprising a shipping address for the meeting prospect.

9. The method of claim 8, further comprising including a computer trackable shipping code with the second complementary article for allowing the meeting requester to track the geographic location of the second complementary article.

10. The method of claim 1, further comprising initiating a second shipment of the complementary article set to a meeting coordinator by supplying delivery instruction for the complementary article set, the delivery instruction comprising a shipping address for the meeting coordinator.

11. The method of claim 10, further comprising receiving the complementary article set and scanning the computer readable identification codes using an electronic optical scanner in a data communication relationship with the database.

12. The method of claim 11, further comprising providing a donation to a charity, the monetary value of the donation approximating the monetary value of the complementary article set, the charity being identified by the meeting requester at the meeting requester interface.

13. The method of claim 1, wherein the complementary article set is a pair of shoes.

14. A system for coordinating a meeting between a meeting requester and a meeting prospect, the system comprising:

at least one network-connected computer system having a processor, a database, and machine readable memory, the at least one network-connected computer system configured to:

receive a meeting request from a meeting requester interface of the meeting requester and store the meeting request in the database cross-referenced with the meeting requester;

enter, into the database, a computer readable identification code associated with a complementary article set, the complementary article set including at least two functionally complementary articles;

cross-reference, by the processor, the computer readable identification code with the meeting request so that the computer readable identification code is identified with the meeting request;

initiate, by the processor, a first shipment of a first one of the complementary articles of the complementary article set to the meeting requester and a second one of the complementary articles of the complementary article set to the meeting prospect and produce a requester identification code cross-referenced with the meeting request and a meeting request document for shipping with the second complementary article;

upon receipt of the second one of the complementary articles by the meeting prospect, receive the requester identification code input by the meeting prospect into a meeting prospect interface;

query the database using the requester identification code to retrieve an identification of the meeting requester;

and instruct the meeting prospect to enter a decision to accept or decline the meeting request at the meeting prospect interface and transmit the decision via the coordinator computer system to the meeting requester.

15. The system of claim 14, wherein the system is configured to enter the computer readable identification code by using an electronic optical scanner in a data communication relationship with the database.

16. The system of claim 14, wherein the system is configured to initiate shipment by using a requester identification code cross-referenced with the meeting request for shipping with the second complementary article.

17. The system of claim 14, wherein the system is further configured to initiate a second shipment of the complementary article set to a charity, the charity being identified by the meeting requester at the meeting requester interface.

18. The system of claim 14, wherein the system is further configured to initiate a second shipment of the complementary article set to a meeting coordinator by supplying a shipping address for the meeting coordinator.

19. The system of claim 14, wherein the complementary article set is a pair of shoes.

* * * * *